3,845,165
SURFACE-COATING COMPOSITIONS CONTAINING [(SUBSTITUTED INDAZOLYL)-N¹-METHYL]CARBAMATES

Pasquale P. Minieri, Woodside, N.Y., assignor to Tenneco Chemicals, Inc.
No Drawing. Application Nov. 29, 1972, Ser. No. 310,670, which is a continuation-in-part of applications Ser. No. 141,999, May 10, 1971, now Patent No. 3,741,979, and Ser. No. 247,084, Apr. 24, 1972. Divided and this application Feb. 5, 1974, Ser. No. 439,720
Int. Cl. C09d 5/14
U.S. Cl. 260—89.1
9 Claims

ABSTRACT OF THE DISCLOSURE

Compounds that have the structural formula

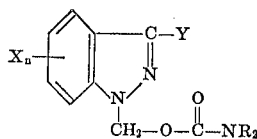

wherein X represents halogen, nitro, amino, acetamino, or (halobenzylidene)amino; n represents an integer in the range of 0 to 3; each R represents hydrogen, lower alkyl, phenyl, halophenyl or nitrophenyl; when n is 0, Y represents halogen; and when n is 1 to 3, Y represents hydrogen or halogen are used to protect surface-coating compositions from deterioration resulting from attack by fungi and bacteria. Illustrative of these compounds is (3-chloroindazolyl-N¹-methyl) N-methylcarbamate.

---

This is a division of my copending application Ser. No. 310,670, which was filed on Nov. 29, 1972 and which is a continuation-in-part of my copending applications Ser. No. 141,999, which was filed on May 10, 1971 and which is now U.S. Pat. No. 3,741,979, and Ser. No. 247,084, which was filed on Apr. 24, 1972.

This invention relates to surface-coating compositions that have improved resistance to deterioration resulting from attack by fungi, bacteria, and other microorganisms. More particularly, it relates to surface-coating compositions that contain biocidal amounts of [(substituted indazolyl)-N¹-methyl]carbamates.

It is well known in the art that paints and varnishes often have inadequate resistance to the action of microorganisms. Some of these coating compositions, such as enamels and house paints, contain as their resinous binders drying oils, oleoresinous varnishes, or alkyd resins, which are subject to attack by fungi and bacteria. Others, for example, aqueous dispersions of water-insoluble synthetic linear polymers, generally contain as plasticizers and thickeners materials that have their origin in animal or vegetable sources and that render the compositions susceptible to mildew. The resulting deterioration of the surface-coating compositions seriously hinders their full scale utilization, particularly in those areas and in those applications that are conducive to such attack.

Various biocidal materials have been suggested for use in surface-coating compositions, but none has proven entirely satisfactory in this application. Some do not provide the required prolonged protection against attack by microorganisms, while others have an adverse effect on the color, odor, or viscosity of the composition or undergo sulfide staining, and still others hydrolyze in alkaline aqueous paint systems or separate from the applied coating by migration, volatilization, or leaching once the coating has been spread in a thin layer over the surface to be protected.

In accordance with this invention, it has been found that [(substituted indazolyl)-N¹-methyl]carbamates are of particular value as biocides in surface-coating compositions. These compounds, which are thoroughly compatible with the resinous binders that are commonly used in surface-coating compositions and which are resistant to sulfide staining, provide excellent and prolonged resistance to deterioration resulting from attack by fungi and bacteria without adversely affecting the color, pH, viscosity, odor, and other physical properties of the surface-coating compositions.

The biocidal compounds that are used in the surface-coating compositions of this invention may be represented by the structural formula

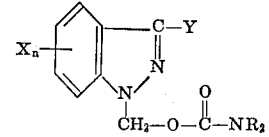

wherein X represents chlorine, bromine, fluorine, iodine, nitro, amino, acetamino, (chlorobenzylidene)amino, (bromobenzylidene)amino, (fluorobenzylidene)amino, or (iodobenzylidene)amino; n represents an integer in the range of 0 to 3; each R represents hydrogen, alkyl having 1 to 4 carbon atoms, phenyl, chlorophenyl, bromophenyl, fluorophenyl, iodophenyl, or nitrophenyl; when n is 0, Y represents chlorine, bromine, fluorine, or iodine; and, when n is 1 to 3, Y represents hydrogen, chlorine, bromine, fluorine, or iodine.

Illustrative of these compounds are the following:

(3-chloroindazolyl-N¹-methyl) N-methylcarbamate,
(3-bromoindazolyl-N¹-methyl) N-methylcarbamate,
(3-fluoroindazolyl-N¹-methyl) N-methylcarbamate,
(3-iodoindazolyl-N¹-methyl) N,N-dibutylcarbamate,
(5,7-dichloroindazolyl-N¹-methyl) N-methylcarbamate,
(6-nitroindazolyl-N¹-methyl) N,N-diethylcarbamate,
(3,4-diaminoindazolyl-N¹-methyl) N-phenylcarbamate,
(6-acetaminoindazolyl-N¹-methyl) N-p-bromophenylcarbamate,
[6-(chlorobenzylidene)aminoindazolyl-N¹-methyl] N-p-nitrophenylcarbamate,
(4,5,7-tribromoindazolyl-N¹-methyl) N-methyl-N-butylcarbamate,
(3-chloro-6-acetaminoindazolyl-N¹-methyl) N,N-diethylcarbamate,
(6-nitroindazolyl-N¹-methyl) N-3,4-dichlorophenylcarbamate, and the like.

The most effective of these compounds as biocides in surface-coating compositions are the compounds having the aforementioned structure in which X represents chlorine or nitro and Y represents chlorine or hydrogen. Among these preferred compounds are (3-chloroindazolyl-N¹-methyl) N-methylcarbamate,
(3,5,7-trichloroindazolyl-N¹-methyl) N-ethylcarbamate,
(3-chloro-6-nitroindazolyl-N¹-methyl) N,N-dibutylcarbamate,
(5,7-dichloroindazolyl-N¹-methyl) N,N-dimethylcarbamate,
(5,6-dinitroindazolyl-N¹-methyl)-N-phenylcarbamate, and the like.

The carbamates of this invention may be prepared by any suitable and convenient procedure. For example, they may be prepared by heating an N¹-hydroxymethyl-(substituted indazole) with the appropriate isocyanate. The reaction is generally carried out in a solvent, such as benzene, toluene, acetone, or tetrahydrofuran, at the reflux temperature of the reaction mixture.

In a preferred embodiment of this invention, the biocidal carbamates are used to impart fungal and bacterial resistance to dried films of protective or decorative coating compositions that have been applied to a surface. When they are added in the amount of about 0.1 percent to 3 percent, and preferably 1 percent to 2 percent, based on the weight of the surface-coating composition, these compounds provide excellent and prolonged resistance to deterioration resulting from attack by fungi, bacteria, and other microorganisms without adversely affecting the physical properties of the surface-coating compositions or of the dried films of these compositions The [(substituted indazolyl) - $N^1$-methyl]carbamates can be used to impart fungal and bacterial resistance to a wide variety of surface-coating compositions including both organic solvent-based and water-based coating systems. They are particularly valuable as biocides in coatings that contain as their resinous binder either an oleoresinous material or a water-insoluble synthetic linear addition polymer.

Among the surface-coating compositions in which the compounds of this invention can be used as the biocide are organic solvent-based systems that contain such oleoresinous binders as drying oils, for example, linseed oil, tung oil, soybean oil, dehydrated castor oil, safflower oil, or fish oil; bodied drying oils; blends of drying oils or bodied drying oils with a resin component, such as limed rosin, ester gum, or a phenolic resin; oleoresinous varnishes formed by heating the aforementioned resins with drying oils or bodied drying oils; and alkyd resins.

The novel carbamates can also be used as the biocide in aqueous dispersions that contain about 10 percent to 60 percent by weight of an organic water-insoluble, film-forming, resinous binder that is an oleoresinous binder as hereinbefore defined and/or a synthetic linear addition binder. The aqueous dispersions of synthetic linear addition polymers are ordinarily prepared by the emulsion polymerization of ethylenically-unsaturtaed compounds, especially those of monoethylenically-unsaturated character, although butadiene, chlorobutadiene, and isoprene may be used to some extent. Illustrative of the synthetic linear addition polymers that can be used as the resinous binder in the aqueous dispersions are polyvinyl acetate; polyvinyl butyrate; polyvinyl chloride; copolymers of vinyl acetate with vinyl chloride or acrylonitrile; copolymers of vinyl chloride with acrylonitrile or vinylidene chloride; polyethylene; polyisobutylene; copolymers of styrene with butadiene, acrylonitrile, or maleic anhydride; copolymers of acrylic acid esters or methacrylic acid esters of alcohols having 1 to 8 carbon atoms with vinyl acetate, vinyl chloride, acrylonitrile, or styrene; copolymers of the aforementioned acrylic acid esters, the aforementioned methacrylic acid esters, and acrylic acid; and mixtures thereof.

In addition to the resinous binder and the biocidal compound, the surface-coating compositions may contain various auxiliary materials, such as pigments, extenders, solvents, dyes, defoaming agents, driers, emulsifiers, plasticizers, and the like in the amounts ordinarily used for these purposes.

The biocidal compounds may be incorporated into the surface-coating compositions by any convenient procedure. For example, they can be combined with the pigments and other ingredients to form a pigment phase that is mixed with the resinous binder and water or organic solvent to form the surface-coating composition. Alternatively, they can be added to a composition that contains the resinous binder, pigment, and water or organic solvent. The biocidal compounds can be added as such to the other ingredients, or they can be added as a solution in, for example, an alcohol, ether, hydrocarbon or ketone.

The invention is further illustrated by the following examples.

EXAMPLE 1

To a mixture of 18.1 grams (0.1 mole) of $N^1$-hydroxymethyl - 3 - chloroindazole, 1 ml. of triethylamine, and 150 ml. of tetrahydrofuran was added 6.4 grams (0.133 mole) of methyl isocyanate over a period of about 10 minutes during which time its temperature rose from 22° C. to 26° C. The reaction mixture was heated to its reflux temperature in 20 minutes and held at this temperature for 75 minutes. It was cooled and allowed to stand overnight at room temperature. It was then cooled in an ice bath and filtered. The product was dried at 60° C. under reduced pressure. There was obtained 15.6 grams of (3 - chloroindazolyl - $N^1$ - methyl)N-methylcarbamate, which melted at 161°–167° C.

EXAMPLE 2

To a mixture of 19.2 grams (0.1 mole of $N^1$-hydroxymethyl-6-nitroindazole, 1 ml. of triethylamine, and a 50 ml. of tetrahydrofuran was added 24.9 grams (0.133 mole) of 3,4-dichlorophenyl isocyanate over a period of about 10 minutes during which its temperature rose to 25° C. The reaction mixture was heated at its reflux temperature for 85 minutes, cooled, and allowed to stand overnight at room temperature. It was then cooled in an ice bath and filtered. The product was dried at 60° C. under reduced pressure. The (6-nitroindazolyl-$N^1$-methyl) N-3,4-dichlorophenylcarbamate obtained melted at 194°–6° C. (dec.) and contained 18.8% Cl (calculated, 18.6% Cl).

EXAMPLE 3

The procedure described in Example 1 was repeated using $N^1$-hydrozymethyl-5,7-dichloroindazole in place of $N^1$-hydroxymethyl-3-chloroindazole and ethyl isocyanate in place of methyl isocyanate. The (5,7-dichloroindazolyl-$N^1$-methyl)N-ethylcarbamate obtained contained 22.3% Cl (calculated 24.6% Cl).

EXAMPLE 4

(A) A polyvinyl acetate emulsion paint was prepared by mixing together the following materials:

| | Parts by weight |
|---|---|
| Water | 280 |
| Potassium pyrophosphate | 3 |
| Calcium metasilicate | 135 |
| Titanium dioxide (rutile) | 220 |
| 2% Aqueous solution of methylcellulose | 200 |
| Diethyl ether of diethylene glycol | 37 |
| 55% Aqueous dispersion of polyvinylacetate | 350 |

(B) An acrylic paint was prepared by mixing together the following materials:

| | Parts by weight |
|---|---|
| Water | 250 |
| Acrylic ester resin (100% solids)(Acryloid B-6) | 385 |
| Monoethyl ether of ethylene glycol | 259 |
| Titanium dioxide | 143 |
| Aluminum silicate | 45 |
| Magnesium silicate | 98 |

(C) An exterior house paint was prepared by mixing together the following materials:

| | Parts by weight |
|---|---|
| Basic lead carbonate | 288 |
| Zinc oxide | 232 |
| Titanium dioxide (rutile) | 149 |
| Talc | 260 |
| Linseed oil | 242 |
| Bodied linseed oil | 114 |
| Mineral spirits | 114 |
| Antiskinning agent (Exkin 2) | 2 |
| Manganese naphthenate (6% Mn) | 2.27 |
| Lead naphthenate (24% Pb) | 11.3 |

(D) To samples of these paints was added either 2 percent by weight of one of the compounds of this invention or 2 percent by weight of a comparative biocide.

EXAMPLE 5

Samples of the acrylic paint, the polyvinyl acetate paint, and the oil-based paint whose preparation was described in Example 4 were evaluated by means of an agar diffusion assay. In this test agar is inoculated with the test organism, the treated paint is placed in a well cut from the agar, and after incubation at 28° C. and 85–95% relative humidity, the activity of the biocide is measured by zones of inhibition. The biocidal compounds tested and the results obtained are given in the following table. In this table ZO—Zone of inhibition in mm.
O—No growth; no zone of inhibition
Tr—Trace of zone of inhibition
— —Not tested
Bacteria A—*Bacillus subtilis*
Bacteria B—*Aerobacter aerogenes*
Bacteria C—*Pseudomonas aeruginosa*
Fungi D—*Pullularia pullulans*
Fungi E—*Penicillium crustosum*
Fungi F—*Aspergillus niger*

The biocidal compounds tested and the results obtained are set forth in the table that follows.

TABLE

| | | | Biocidal Activity | | | | | |
| | | | Bacteria | | | Fungi | | |
| Biocide | Paint | pH | A | B | C | D | E | F |
| --- | --- | --- | --- | --- | --- | --- | --- | --- |
| Product of— | | | | | | | | |
| Example 1 | Acrylic | 9.3 | Tr | O | O | O | O | ZO-7 |
| | PVA | 7.4 | O | O | O | O | O | O |
| | Oil | | | | | O | O | O |
| Example 2 | Acrylic | 8.9 | O | O | O | ZO-1 | ZO-2 | Tr |
| | PVA | 8.7 | O | O | O | ZO-2 | O | O |
| | Oil | | | | | O | O | O |
| Bis(phenylmercury) dodecenylsuccinate (Super Ad-it) | Acrylic | 8.4 | ZO-9 | ZO-6 | ZO-6 | ZO-10 | ZO-1 | ZO-10 |
| | PVA | 6.9 | ZO-10 | ZO-2 | ZO-7 | ZO-10 | ZO-6 | ZO-8 |
| | Oil | | | | | ZO-10 | ZO-4 | ZO-10 |

Each of the other [(substituted indazolyl)-N¹-methyl] carbamates disclosed herein can be used in a similar way to protect surface-coating compositions from deterioration resulting from attack by fungi and bacteria.

What is claimed is:

1. A surface-coating composition that comprises (a) an organic, water-insoluble, film-forming, resinous binder and (b) a biocidally-effective amount of a biocidal compound having the structural formula

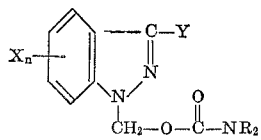

wherein X represents halogen, nitro, amino, acetamino, or (halobenzylidene)amino; $n$ represents an integer in the range of 0 to 3; each R represents hydrogen, alkyl having 1 to 4 carbon atoms, phenyl, halophenyl, or nitrophenyl; when $n$ is 0, Y represents halogen; and, when $n$ is 1 to 3, Y represents hydrogen or halogen.

2. A surface-coating composition as set forth in claim 1 that contains 0.10 percent to 3 percent, based on the weight of the composition, of the biocidal compound.

3. A surface-coating composition as defined in claim 1 that contains 0.5 percent to 2 percent, based on the weight of the composition, of the biocidal compound.

4. A surface-coating composition as defined in claim 1 wherein the biocidal compound is (3-chloroindazolyl-N¹-methyl)N-methylcarbamate.

5. A surface-coating composition as defined in claim 1 wherein the biocidal compound is (6-nitroindazolyl-N¹-methyl)N-3,4-dichlorophenylcarbamate.

6. A surface-coating composition as defined in claim 1 wherein the biocidal compound is (5,7-dichloroindazolyl-N¹-methyl)N-ethylcarbamate.

7. A surface-coating composition as set forth in claim 1 wherein the organic, water-insoluble, film-forming, resinous binder is selected from the group consisting of oleoresinous binders, synthetic linear addition polymers, and mixtures thereof.

8. A surface-coating composition as set forth in claim 1 wherein the organic, water-insoluble, film-forming, resinous binder is polyvinyl acetate.

9. A surface-coating composition as set forth in claim 1 wherein the organic, water-insoluble, film-forming, resinous binder is an acrylic ester resin.

References Cited

UNITED STATES PATENTS

| 3,637,736 | 1/1972 | Minieri | 106—15 AF |
| 3,779,973 | 12/1973 | Minieri | 106—15 AF |

HARRY WONG, JR., Primary Examiner

U.S. Cl. X.R.

106—15 AF; 260—29.6 MN, 42.22, 89.5 S